March 11, 1930.   L. A. PARADISE   1,749,777
HARVESTER BINDER
Filed Feb. 23, 1927   2 Sheets-Sheet 2
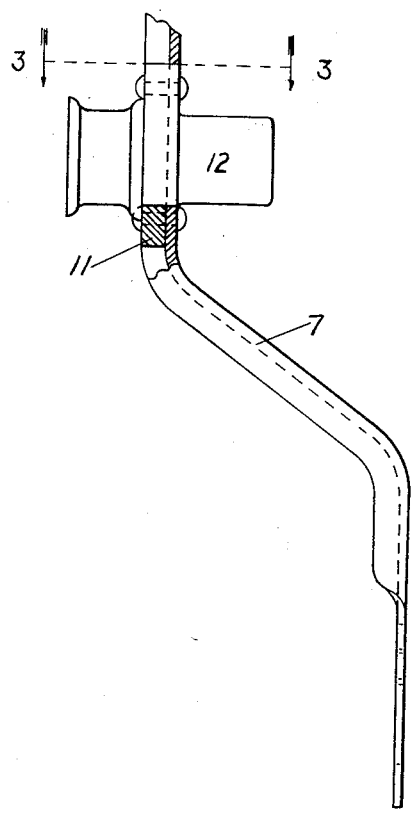
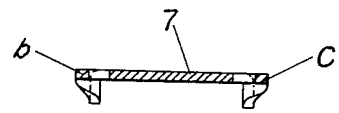
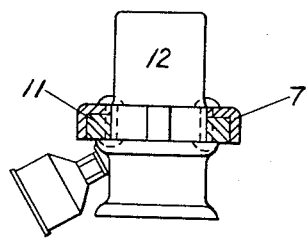

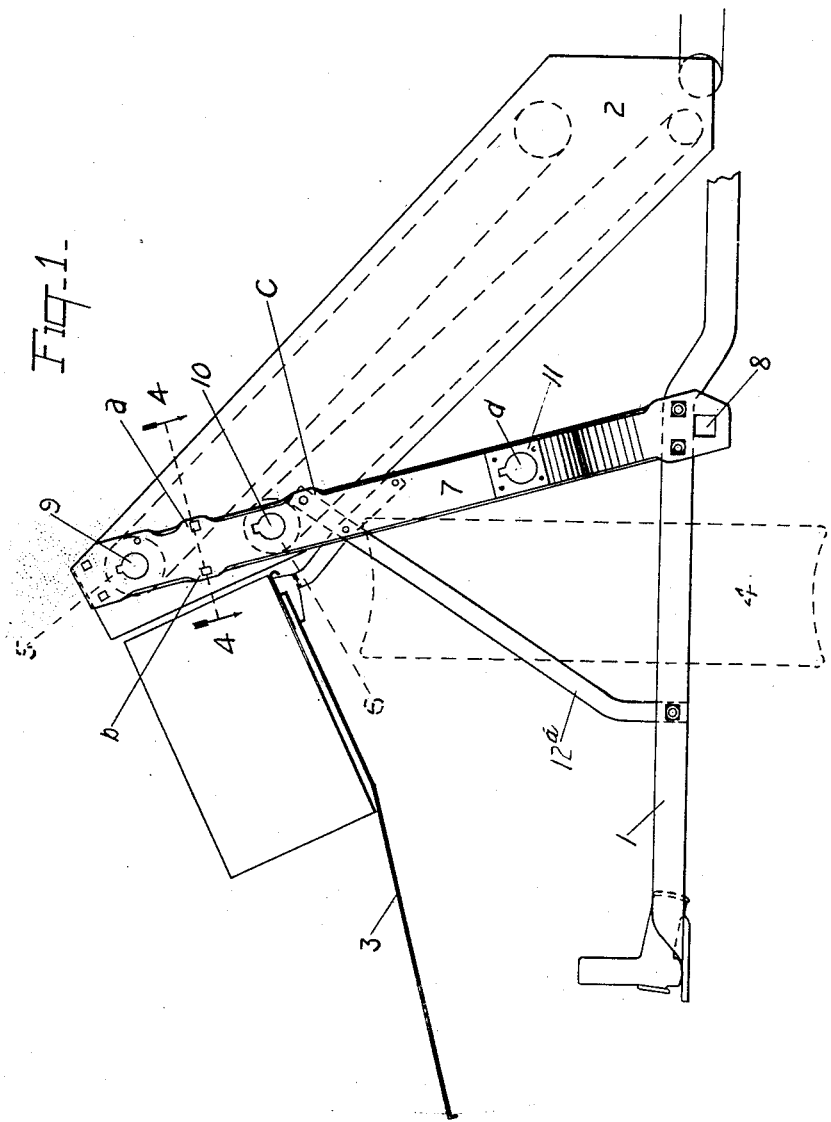

Patented Mar. 11, 1930

1,749,777

UNITED STATES PATENT OFFICE

LOUIS A. PARADISE, OF MOLINE, ILLINOIS, ASSIGNOR TO DEERE & COMPANY, OF MOLINE, ILLINOIS, A CORPORATION OF ILLINOIS

HARVESTER BINDER

Application filed February 23, 1927. Serial No. 170,081.

My invention relates to harvester binders, and more particularly to a structural improvement therein, my object being to simplify the construction by combining in one element what has heretofore been composed of several.

Referring to the drawings in which similar numerals indicate identical parts—

Figure 1 is a front elevation, in part, of a harvester and binder embodying my improvement;

Figure 2 is an enlarged detail side view of the lower part of my device;

Figure 3 is a section on the line 3—3 of Figure 2, and

Figure 4 is a cross-section of my device on the line 4—4 of Figure 2.

The part of the harvester shown comprises the front of the main frame, the front plate 2 of the elevators, the deck 3, and in dotted lines the bull wheel 4. As heretofore constructed, the power shaft and the upper rollers of the elevators have been supported in castings, as well known in the art. Such castings add to the cost of the machine; therefore, a substitute is desirable, which will possess qualities other than supplied by the castings. This want is met by my device, which is not only a support for the upper rollers 5 and 6, shown in dotted lines in Figure 1, but is also a rigid support for the front of the elevator.

I construct my device of channel bar 7, the top of which, 8, is flattened out and cut to conform to the top of the elevator plate 2 to which it is bolted, the channel being presented outward. The lower portion of the bar 7 is bent inwardly toward the harvester and then downwardly, as shown more clearly in Figure 2, and terminates below the frame 1, the lower end of the bar being flattened out and rigidly bolted to the frame 1; below the frame 1 a square hole 8 is made in the bar 1 for reception of a transport axle. An opening 9 is for holding a bearing of the upper elevator roller, and a similar opening 10 is provided for the lower elevator roller 6.

Immediately above the bend of the lower portion of the bar 7 is an opening $d$ for the bearing of the shaft, which takes power from the bull wheel 4, and as this shaft is subjected to greater strain than the rollers, I have inserted a block 11, riveted in place, for the bearing 12 of said shaft, which is illustrated in Figures 2 and 3. Preferably, as at $a$, $b$ and $c$, I flatten out the sides of the channel bar 7 to provide a greater surface, in contact with the plate 2, and a greater space between the bolts which secure the bar 7 and plate 2 together. A brace $12^a$ is bolted to the frame 1 and extends diagonally upward toward the bar 7 and the elevator plate 2 to which it is secured by the bolt at $c$. The channel bar 7 is at a grainward angle from the perpendicular to carry the bearing of the elevator rollers 5 and 6 and the bearing of the power shaft, and with the brace $12^a$ provides a sturdy support for the parts stated.

My device is economical, thoroughly efficient, and dispenses with several parts commonly used for the same purpose.

What I claim is—

1. In a grain harvester and binder, the combination with the main frame and the front elevator support, of a channel bar having both ends flattened and rigidly secured respectively to said support and the main frame, said bar being provided with a plurality of bearing supporting openings.

2. In a grain harvester and binder, the combination with the main frame and the front elevator support, of a channel bar inclined downwardly in a grainward direction and presenting the channel forwardly, said bar flattened at both ends and rigidly secured respectively to the support and the main frame, said bar being provided with a plurality of bearing supporting openings.

3. In a grain harvester and binder, the combination with the main frame and front elevator support, of a channel bar presenting the channel forwardly and flattened at each end and at predetermined points between the ends, said ends rigidly secured respectively to the elevator support and the main frame, said bar being provided with a plurality of bearing supporting openings.

4. In a grain harvester and binder, the combination with the main frame and the elevator support, of a bearing supporting bar secured to the main frame and said support and provided with a plurality of bearing-supporting openings.

LOUIS A. PARADISE.